March 14, 1961  A. P. SOARES ET AL  2,974,715
METHOD AND DEVICE FOR REPAIRING TIRES IN GENERAL
Filed Nov. 14, 1957

INVENTORS:
AFFONSO PEREIRA SOARES
MARIO LUCCI
BY
AGENT

United States Patent Office 2,974,715
Patented Mar. 14, 1961

2,974,715

METHOD AND DEVICE FOR REPAIRING TIRES IN GENERAL

Affonso Pereira Soares and Mario Lucci, both of Rua Prates 956, Sao Paulo, Brazil Filed Nov. 14, 1957, Ser. No. 696,403

1 Claim. (Cl. 154—14)

The present invention relates to a new method and device for repairing punctures in tires, which ensure an easy, safe and rapid obturation of holes up to 10 millimeters diameter, caused by nails, screws and the like; this device or plug can be applied to conventional tires for passenger cars, trucks, busses, tractors and especially tubeless tires.

The invented method and device can be used by anybody and does not involve the use of specially designed tools.

This plug is especially designed to repair punctures caused by nails, screws and similar objects, which may have pierced the tire, but did not enlarge the hole, taking into consideration that any type of plug must be used to seal the puncture and never to widen it, like those plugs which have been made up to the present time.

The invention is represented by way of nonrestrictive example in the appended drawings, in which.

Figure 1:
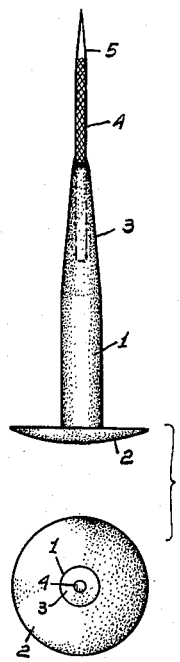
Fig. 1 is an elevation view of the device, with the corresponding plan view.
Figure 2:
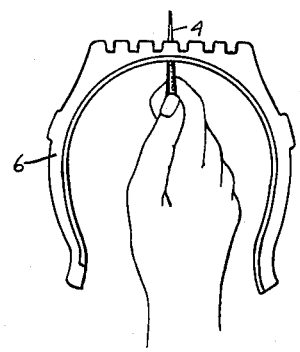
Figs. 2, 3, 4, 5 and 6 illustrate the sequence of operations which are performed in repairing a tubeless tire with the invented device and following the invented method.
Figure 3:
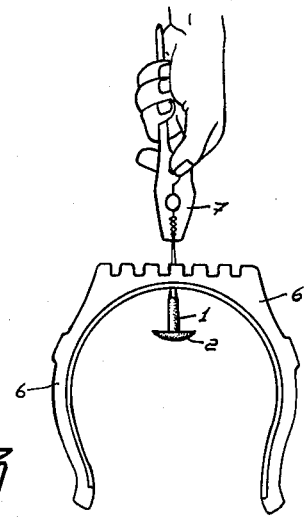
Figure 4:
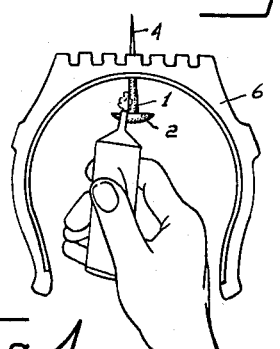

In accordance with the invention, the device for repairing punctures in tires in general consists in a cylindrical body or plug 1, made of natural or synthetic rubber with the required characteristics, which has a large head 2 in its lower end, and an elongated conical section 3, in its opposite end. At this conical end is fixed by any known means, a metallic pin 4, with a sharp point 5 and having a rough surface.

Figure 5:
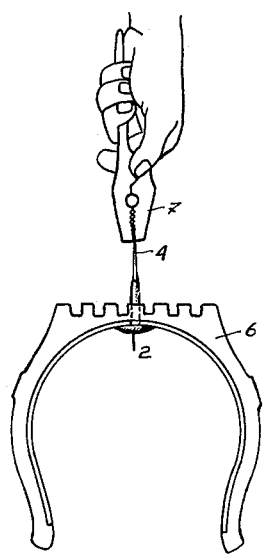
Figure 6:
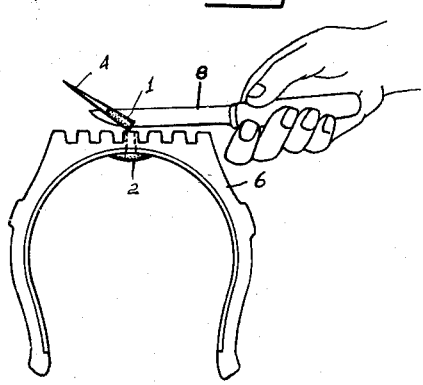

The use of the described device in accordance with the invented method is very simple. As it is seen in the attached drawings (Figures 2 to 6), once removed the tire 6 from the wheel and found the puncture, the described device is therein inserted from the inside of the tire until the sharp point 5 of the metallic pin 4 has passed the entire thickness of the tire; the device is then longitudinally moved several times in the hole in order to clean it by means of the rough surface of the pin. By means of a suitable tool 7, the pin 4 is then pulled towards the outside of the tire, until the conical end 3 of the body or plug 1 penetrates the hole; a suitable cement is then applied to the surface of the cylindrical body 1 and to the upper face of the head 2, and the device is completely passed through the hole, until the upper face of the head 2 abuts the inner surface of the tire, as shown in Fig. 5. By means of a knife 8, the protruding end of the body 1 is cut off and the tire is ready to be mounted on the wheel.

The rubber body or plug 1 and the metallic pin 4, as well as the head 2, can be obviously manufactured in various diameters and lengths.

The plug must always be larger than the hole. Therefore, if the puncture is 5 millimeter diameter, it must be applied a 6 or 7 millimeter plug so that when inserted into the hole, the rubber will stretch out, turning into its natural state after a while, sealing the puncture and stopping air leakage.

The basis or head will complete the sealing, acting like a small inside patch.

The plugs are provided at the basis with a coat of curing rubber or any other adequate sticking material, which is pressed against the tire body by the air pressure. While the tire is running the natural heat will allow the plug to cure in the tire body.

The device described above can vary in size and shape. It can be round or oval shaped or any other shape to adapt to the various cases which may come up.

The metal pin can also vary in length or diameter and be smooth or tough like a steel rasp.

Having thus described the invention, what we claim is:

A method of repairing a punctured tire with the aid of a resilient patch having an enlarged head and an elongated stem from whose free extremity there projects a rigid, rough-surfaced pin with a pointed end, comprising the steps of introducing said pointed end into the puncture from inside the tire, cleaning the puncture by repeatedly moving said rough-surfaced pin back and forth therein, coating said stem with an adhesive, further inserting said patch along with said adhesive into said puncture by gripping said pin from without and pulling until said head strikes the inner tire surface, and cutting off the outwardly projecting part of said stem.

References Cited in the file of this patent

UNITED STATES PATENTS

| | | |
|---|---|---|
| 1,576,491 | Young | Mar. 9, 1926 |
| 2,076,985 | Elliott | Apr. 13, 1937 |
| 2,762,413 | Walter | Sept. 11, 1956 |

FOREIGN PATENTS

| | | |
|---|---|---|
| 490,231 | Canada | Feb. 3, 1953 |